United States Patent
Cutu et al.

(10) Patent No.: US 10,147,167 B2
(45) Date of Patent: Dec. 4, 2018

(54) SUPER-RESOLUTION IMAGE RECONSTRUCTION USING HIGH-FREQUENCY BAND EXTRACTION

(71) Applicant: Heptagon Micro Optics Pte. Ltd., Singapore (SG)

(72) Inventors: Florin Cutu, San Jose, CA (US); James Eilertsen, Pittsford, NY (US)

(73) Assignee: Heptagon Micro Optics Pte. Ltd., Singapore (SG)

( * ) Notice: Subject to any disclaimer, the term of this patent is extended or adjusted under 35 U.S.C. 154(b) by 35 days.

(21) Appl. No.: 15/350,214

(22) Filed: Nov. 14, 2016

(65) Prior Publication Data

US 2017/0148139 A1     May 25, 2017

Related U.S. Application Data

(60) Provisional application No. 62/259,845, filed on Nov. 25, 2015.

(51) Int. Cl.

| | |
|---|---|
| *G06K 9/32* | (2006.01) |
| *G06T 3/40* | (2006.01) |
| *H04N 5/208* | (2006.01) |
| *H04N 9/64* | (2006.01) |
| *G06T 5/50* | (2006.01) |
| *H04N 5/349* | (2011.01) |
| *H04N 9/04* | (2006.01) |

(52) U.S. Cl.
CPC ........... *G06T 3/4061* (2013.01); *G06T 5/50* (2013.01); *H04N 5/208* (2013.01); *H04N 5/349* (2013.01); *H04N 9/045* (2013.01); *H04N 9/646* (2013.01); *G06T 2207/10024* (2013.01); *G06T 2207/20221* (2013.01)

(58) Field of Classification Search
CPC ...... H04N 5/23232; H04N 9/646; G06T 7/13; G06T 2207/20221; G06T 5/001
See application file for complete search history.

(56) References Cited

U.S. PATENT DOCUMENTS

| | | | |
|---|---|---|---|
| 6,330,344 B1 | 12/2001 | Kondo et al. | |
| 7,583,860 B2 | 9/2009 | Kuo et al. | |
| 2005/0276475 A1* | 12/2005 | Sawada ................. | H04N 1/648 382/167 |
| 2006/0038891 A1* | 2/2006 | Okutomi ................ | H04N 9/045 348/222.1 |
| 2010/0097491 A1* | 4/2010 | Farina ................... | H04N 9/045 348/223.1 |

\* cited by examiner

*Primary Examiner* — Eueng-Nan Yeh
(74) *Attorney, Agent, or Firm* — Fish & Richardson P.C.

(57) ABSTRACT

Generating a super-resolved reconstructed image includes acquiring a multitude of monochromatic images of a scene and extracting high-frequency band luma components from the acquired images. A high-resolution luma image is generated using the high-frequency components and motion data for the acquired images. The high-resolution luma image is combined with an up-sampled color image, generated from the acquired images, to generate a super-resolved reconstructed color image of the scene.

12 Claims, 4 Drawing Sheets

SUPER-RESOLUTION IMAGE RECONSTRUCTION USING HIGH-FREQUENCY BAND EXTRACTION

CROSS-REFERENCE TO RELATED APPLICATION(S)

The present application claims the benefit of priority of U.S. Provisional Patent Application No. 62/259,845, filed on Nov. 25, 2015, the contents of which are incorporated herein in their entirety.

FIELD OF THE DISCLOSURE

The present disclosure relates to super-resolution image reconstruction.

BACKGROUND

Environmental factors and the inherent resolution of image sensors sometimes makes it difficult to achieve high-resolution images.

Super-resolution (SR) reconstruction techniques, however, can enhance the resolution of digital imaging sensors. For example, super-resolution reconstruction can use pixel values from two or more images, each of which has a resolution dictated by the physical resolution of the digital image sensor, and can enhance the resolution of the reconstructed images beyond the physical resolution of the digital image sensor. Accordingly, images captured, for example, by small, inexpensive, low-power digital image sensors can be enhanced to a level on par with a larger, more expensive, higher-power digital image sensor. Super-resolution also can be employed in other industries and applications.

Typically, super-resolution requires two or more images of a scene that are taken from slightly different viewpoints. Accordingly, each image of the same scene differs somewhat from the other images. For example, there may be a sub-pixel shift between location of an object in the images. Such a shift is sometimes referred to as motion. Motion can occur, for example, when the scene shifts slightly (e.g., multiple images of a moving object are acquired or multiple images of a scene are acquired by a moving camera) or when the images are captured by multiple cameras (such as by a multi-channel array camera). If differences between images are caused by something other than motion, typical super-resolution reconstruction techniques cannot be used because the motion estimation stage of the super-resolution techniques fails.

For example, differences between images (other than motion) can be present for images taken with multiple adjacent cameras (or channels) where each camera has a different spectral filter. The images from the channels can contain motion (because the images are acquired from slightly different viewpoints). The images from each channel also may differ because they contain different pixel values associated with a particular color of light incident on each respective channel sensor (assuming, e.g., that each channel is associated with a different spectral filter). In such a scenario, typical super-resolution reconstruction would not be successful because the different spectral characteristics of the images makes it difficult to correlate them.

Nevertheless, in some cases, imagers having multiple adjacent channels include at least one repeating spectral filter. For example, a four-channel imager may include one channel with a red filter, one channel with a blue filter, and two channels with green filters. Typical super-resolution reconstruction techniques can use the pixel values from the two channels having the repeating spectral filters (i.e., the green filters). On the other hand, the pixel values from the channels having the red and blue filters would not be used. Using such techniques, the resolution of the reconstructed image would be lower than if all four channels could be used to reconstruct the image.

SUMMARY

The inventors of the present disclosure realized that high-frequency content of images of a scene can be substantially invariant from one image to another even when different spectral (i.e., color) filters are used to capture the images. Such high-frequency content can include, for example, edge locations and/or texture in the scene. By extracting the high-frequency content from the images and using the extracted data as input for super-resolution reconstruction, high-resolution luma images can be obtained. The high-resolution luma images then can be used to reconstruct high-resolution color images of the scene.

For example, in one aspect, a method of generating a super-resolved reconstructed image includes acquiring a multitude of monochromatic images of a scene and extracting high-frequency band luma components from the acquired images. The method further includes generating a high-resolution luma image using the high-frequency components and motion data for the acquired images. The high-resolution luma image is combined with an up-sampled color image, generated from the acquired images, to obtain a super-resolved reconstructed color image of the scene.

Some implementations include one or more of the following features. For example, in some cases, the method includes constructing an array of raw monochromatic images based on the acquired images. In some instances, extracting the high-frequency band luma components includes convolving raw monochromatic image data of the scene using a Gaussian filter to obtain a Gaussian filtered image, and subtracting the raw monochromatic image data from the Gaussian filtered image. Extracting the high-frequency band luma components also can include eliminating polarity differences after subtracting the raw monochromatic image data from the Gaussian filtered image. Eliminating polarity differences can include, for example, calculating an absolute value of a difference previously obtained by subtracting the raw monochromatic image data from the Gaussian filtered image. Extracting the high-frequency band luma components also can include equalizing magnitudes of intensity of the high-frequency band luma components, and/or applying a sigmoid function after eliminating polarity differences. In some cases, the extracted high-frequency band luma components correspond to edge locations and/or texture features.

In some implementations, the method includes executing a motion estimation protocol based on the high-frequency band luma components and based on common channels in the raw monochromatic image data, and executing a super-resolution protocol to obtain the high-resolution luma image based on the high frequency luma components and motion data in a linear transform.

Some implementations include performing color image fusion based on the raw monochromatic image data to obtain a low-resolution chroma image, and up-sampling the low-resolution chroma image to obtain the up-sampled color image. Combining the up-sampled color image with the high-resolution luma image can include replacing luma data in the up-sampled color image with high-resolution luma data in the high-resolution luma image.

In some instances, the method further includes visually presenting the super-resolved reconstructed color image on a display device.

In another aspect, an imaging apparatus includes an imaging device having one or more optical channels to acquire monochromatic images of a scene. The apparatus further includes one or more processors configured to extract high-frequency band luma components from the acquired images, generate a high-resolution luma image using the high-frequency components and motion data for the acquired images, and combine the high-resolution luma image with an up-sampled color image, obtained from the acquired images, to obtain a super-resolved reconstructed color image of the scene.

In some implementations, the one or more processors are further configured to implement additional features of the method of generating the super-resolved reconstructed image, including those referred to above.

Some implementations provide one or more of the following advantages. For example, the super-resolved reconstructed color image can improve image and/or pattern recognition by helping more clearly delineate the location of edges and/or texture in the scene. The super-resolved reconstructed color image also can be used in various situations to engage a safety feature of a machine so as to prevent or reduce the likelihood of injury. The super-resolved color images also can be employed, for example, in microscopy, as well as security and surveillance cameras.

Other aspects, features and advantages will be readily apparent from the following detailed description, the accompanying drawings and the claims.

DETAILED DESCRIPTION

In general terms, the present disclosure relates to super-resolution image reconstruction using high-frequency data extraction from the luma data of an array of raw monochromatic images. In the present context, luma refers to the sum, for example, of the red+green+blue (R+G+B) data, whereas chroma refers to the ratio (e.g., (R:G:B)). Although each raw image acquired by a particular imager is monochromatic (that is, each image individually does not contain chroma data), collectively multiple monochromatic images of different colors can provide chroma data.

The high-frequency luma data extracted from the acquired images, which represents only a portion of the total luma data from each monochromatic image, is provided as input to a super-resolution protocol to generate super-resolved luma data. The super-resolved luma data then can be used to replace luma data in a low-resolution, up-sampled image derived from the array of raw monochromatic images. By thus combining the super-resolved luma image and the low-resolution, up-sampled image, the process generates a super-resolved (high-resolution) image having both luma and chroma data. In particular, the luma component of the resultant super-resolved image has high resolution. Although the chroma component of the resultant super-resolved image does not have high resolution, this is not significant for many applications because human perception of resolution depends on the luma component of the image much more than the chroma component.

Figure 1:
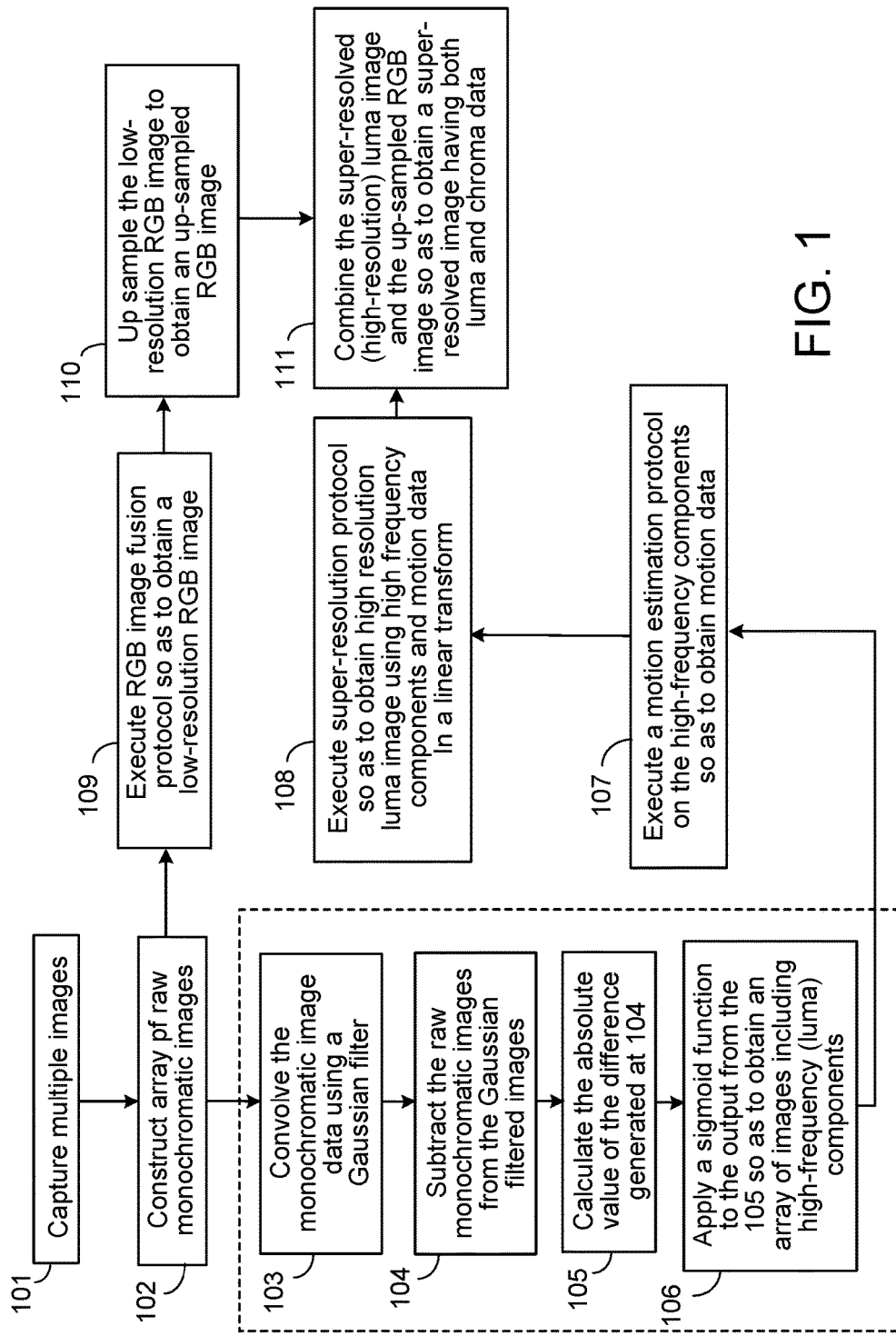
FIG. 1 is a flow chart showing an example of a method of super-resolution reconstruction using high-frequency band extraction.

FIG. 1 illustrates an example of a method of super-resolution reconstruction using high-frequency band extraction.

As indicated by 101, multiple images are acquired by cameras or other image sensors. In typical implementations, light entering through an aperture at one end of an image device is directed to an image sensor by a beam shaping system (e.g., one or more passive optical elements such as lenses). The image sensors include pixels that generate signals in response to sensing received light. Examples of image sensors include CCD (charge-coupled device) image sensors and CMOS (complementary metal-oxide-semiconductor) sensors.

Figure 2A:
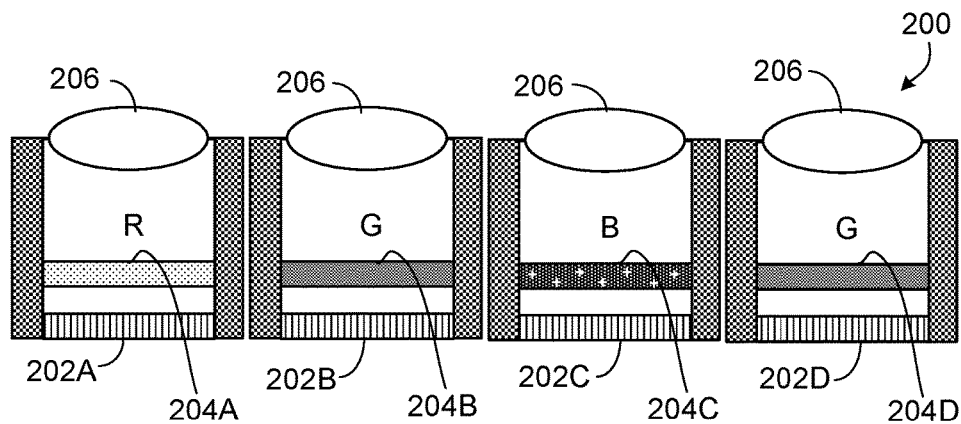
FIG. 2A is an example of a multi-channel optoelectronic imager.

In the scenarios described in connection with FIG. 1, it is assumed that there is motion between different ones of the captured images. For example, in some situations, as illustrated in FIG. 2A, the images are captured by pixel arrays 202A, 202B, 202C, 220D in a multi-channel array imaging device 200. Each pixel array 202A, 202B, 202C, 220D thus can acquire an image of a scene from a viewpoint that differs slightly from that of the other pixel arrays. The slight difference in viewpoints results in a small shift (i.e., motion) in the images of the scene acquired by the pixel arrays. The size of the shift may be, for example, sub-pixel.

In FIG. 2A, each channel has a respective optical filter 204A, 204B, 204C, 204D that allows only specified wavelengths of light to pass for sensing by the pixel array in the particular channel. In the illustrated example, one channel is arranged to sense light in the red (R) part of the visible spectrum, one channel is arranged to sense light in the blue (B) part of the visible spectrum and two channels are arranged to sense light in the green (G) part of the visible spectrum. Other implementations may have a fewer or more optical channels and/or may differ in the optical filters for each channel. Further, in some cases, one or more channels may be arranged to sense light outside the visible part of the spectrum (e.g., infra-red or near-infra-red radiation). Signals indicative of the light intensity sensed by each respective pixel array can be read out and processed in accordance with the method of super-resolution reconstruction described in greater detail below.

As shown in FIG. 2A, each channel also may have a beam shaping system (e.g., one or more passive optical elements such as lenses) 206 disposed over the pixel array.

Figure 2B:
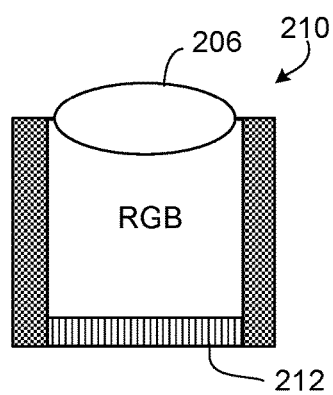
FIG. 2B is an example of a single-channel optoelectronic imager.

In some implementations, the images can be acquired by a single-channel imaging device 210, as illustrated in FIG. 2B. The imaging device 210 can include, for example, an array 212 of demodulation pixels sensitive to a wide range of wavelengths (e.g., visible light in the RGB). In this case, the pixel array 212 is operable to sense and generate output signals for different wavelengths of light at different times. For example, during a first period, the scene would be illuminated with red (R) light and the pixel array 212 would generate a signal indicative of the sensed red light, during a second period the scene would be illuminated with green light and the pixel array 212 would generate a signal indicative of the intensity of the sensed green light, during a third period the scene would be illuminated with blue light and the pixel array 212 would generate a signal indicative of the intensity of sensed blue light, and during a fourth period, the scene would be illuminated with green light and the pixel array 212 would generate a signal indicative of the intensity of the sensed green light.

In the example of FIG. 2B, the wavelength selection can be implemented, for example, based on depth of penetration of the optical signals into the pixels, where different wavelengths penetrate to different depths. In this type of scenario, the motion between the captured images may occur, for example, as a result of slight movement of objects in the scene and/or movement of the imaging device 210. Signals indicative of the light intensity sensed by the pixel array 212 at different times can be read out and processed in accordance with the method of super-resolution reconstruction described below.

To facilitate description of the super-resolution reconstruction method, in the following paragraphs it is assumed that images are acquired using a multi-channel imaging device (as in, e.g., FIG. 2A) that includes four channels that generate, respectively, red (R), blue (B), first green (G1) and second green (G2) data. More generally, the super-resolution reconstruction method can be applied to any plurality of (different) monochromatic images (e.g., R, G, B). Further, as mentioned above, the method can be implemented even if the images are acquired using a single-channel imaging device (as in, e.g., FIG. 2B).

After the images are acquired, the process constructs an array of raw monochromatic images including, respectively, the R, B, G1 and G2 data (102). Next, the process extracts the high-frequency band components from the raw monochromatic image (i.e., the R, B, G1 and G2 data). One way of extracting the high-frequency band components is described next in connection with 103 through 106.

To extract the high-frequency band components, the process convolves the raw monochromatic images (i.e., the R, B, G1 and G2 data) using a Gaussian filter (103). In some cases, the process also can perform de-noising. Next, the process subtracts the original raw monochromatic image data from the Gaussian filtered image data (104). The result of this subtraction is essentially the high-frequency image components, which represent the components of the image such as edge locations and/or texture that do not vary between images acquired using different wavelengths. Next, the process calculates the absolute value of the difference obtained in 104, which eliminates polarity differences among the various high-frequency components (105). Then, in 106, the process applies a sigmoid function to the output of 105. The result of applying the sigmoid function is an array of images that substantially consists of the high-frequency (luma) components $R_h$, $G1_h$, $B_h$, $G2_h$. This latter step is intended to equalize the magnitude of the intensity of the high-frequency components.

Following performance of 105 and 106, the result is that the process has reduced the monochromatic (luma) data from the four optical channels (i.e., G1, G2, R and B) to data that is substantially invariant with respect to magnitude and polarity. Thus, the resultant data ($R_h$, $G1_h$, $B_h$, $G2_h$) is zero or close to zero in flat fields (regions of the scene without texture or edges), the magnitude of signals corresponding to the edges and texture is increased, and the magnitude of the edges and texture are similar from one optical channel to another.

The process continues (in 107) to execute a motion estimation protocol using the output (i.e., $R_h$, $G1_h$, $B_h$, $G2_h$) from 106 and the common channels in the original raw array image (e.g., G1 and G2). Motion estimation is executed relative to a reference image such as G1/G1h and can include: motion estimation between G1 and G2; motion estimation between $G1_h$ and $B_h$; and motion estimation between $G1_h$ and $R_h$. The foregoing motion data obtained from the motion estimation protocol can be referred to, respectively, as MGG, MBG, and MRG.

Motion estimation can be implemented using any one of various standard motion estimation algorithms. One example is described in D. Keren, S. Peleg and R. Brada, "Image Sequence Enhancement Using Sub-Pixel Displacement," IEEE International Conference on Computer Vision and Pattern Recognition (CVPR), pp. 742-746 (1988), which in incorporated herein by reference. Another example is described by Shimizu, M. et al., "Super-resolution from image sequence under influence of hot-air optical turbulence," IEEE International Conference on Computer Vision and Pattern Recognition (CVPR), pp. 1-8 (1988), which also is incorporated herein by reference. Other motion estimation protocols can be used as well.

Next, the process executes a super-resolution protocol so as to obtain a high-resolution luma image using the high frequency components ($R_h$, $G1_h$, $B_h$, $G2_h$) and the motion data (MGG, MBG, MRG) in a linear transform. In this case, only the luma information is super resolved. Standard super-resolution protocols are suitable and can be used.

In some instances, it may be desirable to combine the high-resolution luma image data with chroma (i.e., color) image data so as to obtain a super-resolved reconstructed color image. This part of the process is described next in connection with 109 through 111.

In particular, as indicated by 109, the process executes an image fusion protocol so as to obtain a low-resolution RGB image using the raw image data (e.g., R, G1, B between each imager). The image fusion protocol can apply, for example, a warping technique (e.g., based on feature points). The result of the warping technique is a single (low-resolution) RGB image that contains both chroma and luma values. Specifically, each pixel in the RGB image has three pixels values (i.e., associated, respectively, with an R value, G value, and B value). These values correspond to chroma. In addition, the sum of these values correspond to the luma value. In general, the resolution of the fused image is the same as the resolution of each individual image (R, G1, G2, B).

Next, the process up-samples the low-resolution RGB image so as to obtain an up-sampled image (110). The up-sampling can be accomplished, for example, using standard techniques such as bilinear interpolation. The process then combines the up-sampled RGB image and the high-resolution luma image so as to obtain a super-resolved reconstructed color image (111). In particular, as the up-sampled RGB image contains both chroma and luma values, the luma values in the up-sampled image can be replaced with the high-resolution luma values of the super-resolved image in order to generate a super-resolved image having both luma and chroma data. As noted above, although the chroma component of the resultant super-resolved image does not have high resolution, this is not significant for many applications because human perception of resolution depends on the luma component of the image much more than the chroma component.

Figure 3:
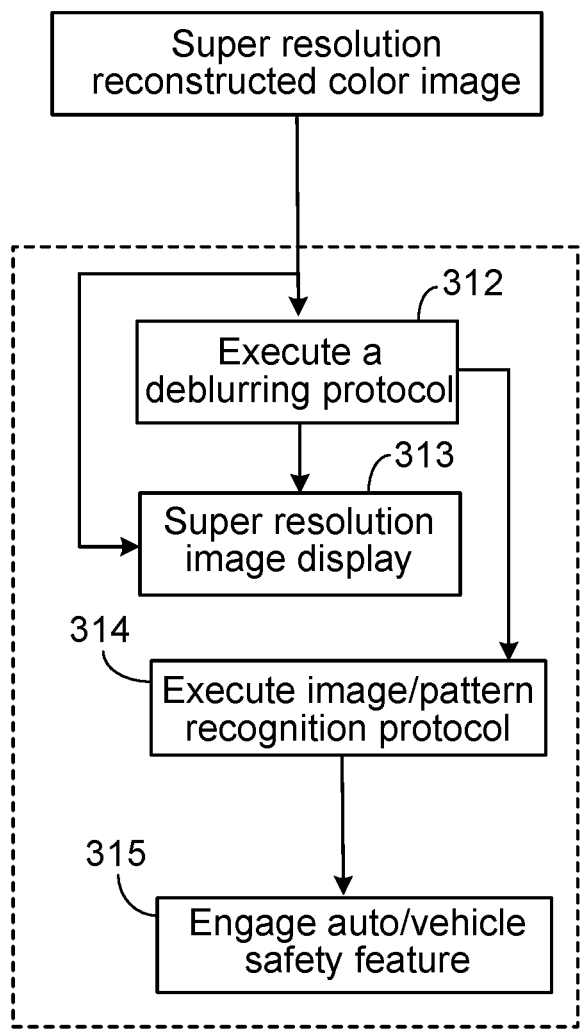
FIG. 3 is a flow chart illustrating examples of applications for a super-resolved reconstructed image.

The reconstructed super-resolved images can be used in various applications where very high-resolution images are needed or desired. For example, as indicated by FIG. 3, the super-resolved image (either the luma image obtained from 108 or the color image obtained from 111)) can be displayed on a display device (313). In some cases, the process executes a deblurring protocol (312) prior to displaying the super-resolution image.

In some instances, the process executes an image or pattern recognition protocol with respect to the super-resolution image (314). Standard image or pattern recognition techniques can be used. Here too, the process may execute a deblurring protocol (312) prior to executing the image or pattern recognition protocol. Using the super-resolution reconstructed image for image or pattern recognition can be advantageous in a variety of applications. One example is to engage a vehicle safety feature. In this context, an optoelectronic module or imaging device, such as illustrated in FIG. 1A or 1B, can be provided in a vehicle and can be used to distinguish between objects in the vehicle's path (e.g., a person crossing in front of the vehicle or some other object in the vehicle's path).

Figure 4:
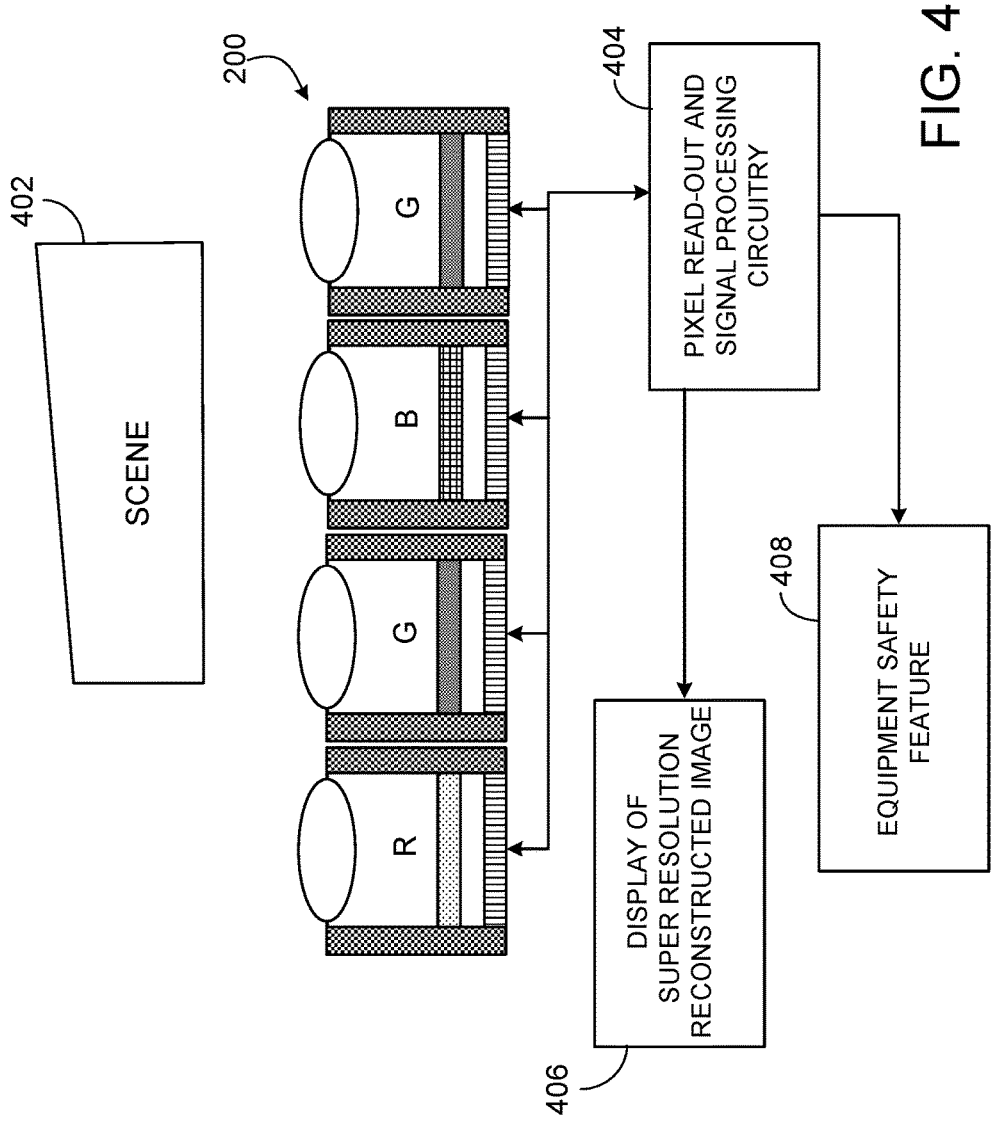
FIG. 4 is an example of a system using super-resolution reconstruction.

FIG. 4 illustrates an example of a system that includes the multi-channel array imaging device 200 of FIG. 1. Signals from the pixel arrays in the various channels of the imaging device 200 are read out by read-out and processing circuitry 404, which can include, for example, one or more integrated circuits in one or more semiconductor chips with appropriate digital logic and/or other hardware components (e.g., read-out registers; amplifiers; analog-to-digital converters; clock drivers; timing logic; signal processing circuitry). The processing circuitry 404 also can include one or more microprocessors or microcomputers configured to process the pixel signals in accordance with 102 through 111 of FIG. 1 and, in some cases, also 312 and/or 314 of FIG. 3, as described above.

The super-resolution reconstructed color image generated by the read-out and processing circuitry 404 can be provided to a display 406, which displays the super-resolution reconstructed color image. The display 406 can include, for example, a screen of a computing device (e.g., a smart phone, tablet, personal computer, or other small computing device). In some instances, the image and/or results of image and/or pattern recognition can be sent to engage a safety feature in machinery, such as an automobile or industrial equipment, so as to help avoid danger or injury.

In some implementations, a single-channel imaging device 210 as illustrated in FIG. 2B can be used in FIG. 4 instead of the multi-channel imaging device 200.

Various implementations described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be readily apparent, various modifications can be made to the foregoing examples within the spirit of the invention. For example, in some instances, some processes or steps may be omitted. Further, in some cases, additional processes or steps may be performed. Other modifications may be made as well. Thus, other implementations are within the scope of the claims.

What is claimed is:

1. A method of generating a super-resolved reconstructed image, the method comprising:
    acquiring a plurality of monochromatic images of a scene;
    extracting high-frequency band luma components from the acquired images;
    generating a high-resolution luma image using the high-frequency band luma components and motion data for the acquired images; and
    replacing luma data in an up-sampled color image, generated from the acquired monochromatic images, with high-resolution luma data in the high-resolution luma image to obtain a super-resolved reconstructed color image.

2. The method of claim 1 wherein extracting the high-frequency band luma components includes:
    convolving raw monochromatic image data of the plurality of monochromatic images of the scene using a Gaussian filter to obtain a Gaussian filtered image; and
    subtracting the raw monochromatic image data from the Gaussian filtered image.

3. The method of claim 2 including constructing an array of raw monochromatic images, including the raw monochromatic image data, based on the acquired images.

4. The method of claim 2 wherein extracting the high-frequency band luma components further includes eliminating polarity differences after subtracting the raw monochromatic image data from the Gaussian filtered image.

5. The method of claim 4 wherein eliminating polarity differences includes calculating an absolute value of a difference previously obtained by subtracting the raw monochromatic image data from the Gaussian filtered image.

6. The method of claim 4 wherein extracting the high-frequency band luma components further includes, after eliminating the polarity differences, equalizing magnitudes of intensity of the high-frequency band luma components.

7. The method of claim 4 wherein extracting the high-frequency band luma components further includes applying a sigmoid function after eliminating polarity differences.

8. The method of claim 2 including:
    executing a motion estimation protocol based on the high-frequency band luma components and based on common channels in the raw monochromatic image data to obtain further motion data; and
    executing a super-resolution protocol to obtain the high-resolution luma image based on the high frequency luma components and the further motion data in a linear transform.

9. The method of claim 1 wherein the extracted high-frequency band luma components correspond to at least one of edge locations or texture features.

10. The method of claim 1 including:
    performing color image fusion based on raw monochromatic image data of the plurality of monochromatic images to obtain a low-resolution chroma image; and up-sampling the low-resolution chroma image to obtain the up-sampled color image.

11. The method of claim 1 including visually presenting the super-resolved reconstructed color image on a display device.

12. The method of claim 1 including using the super-resolved reconstructed color image to engage a safety feature of a machine.

\* \* \* \* \*